UNITED STATES PATENT OFFICE.

LINUS DE PUY, OF GRAND RAPIDS, MICHIGAN.

IMPROVEMENT IN THE MANUFACTURE OF FLUID EXTRACTS.

Specification forming part of Letters Patent No. 123,336, dated February 6, 1872.

Specification describing certain improvements in the pharmaceutical process for extracting the soluble portions of roots, barks, herbs, &c., in a concentrated form, and known in pharmacy as Fluid Extracts, invented by LINUS DE PUY, of Grand Rapids, in the county of Kent and State of Michigan.

The invention relates to the manufacture of fluid extracts from vegetable substances; and consists in subjecting the vegetable matters to be exhausted to maceration under a pressure greater than the normal pressure of the atmosphere without the application of heat.

My process may be practiced in the following manner: The drug or herbs, after being finely powdered and mixed with sufficient fluid or menstruum to produce just the amount of extract desired, is loosely packed in a strong metallic vessel. The vessel is then closed air-tight by means of a suitable cover, which is connected, by means of a nozzle opening through it and by pipes, with an air-dome, which, in turn, is connected with an air-pump. By the latter air is then pumped and forced into the air-dome and macerating-vessel until a pressure of from six to ten atmospheres has been attained therein. Under such pressure the drug is left to macerate for the space of two or three hours, when it is transferred to a suitable press and the extract which is held in suspension in the woody fiber quickly expelled therefrom by the ordinary method of pressure. The use of a less amount of pressure in the air-dome and macerating-vessel than that stated will require the maceration to be protracted for a proportionably longer time to produce the desired result.

By means of the above-described process all vegetable substances can be exhausted of their strength in less time, with less labor, and by the use of a less amount of menstruum than by any process now known, exhausting more perfectly the substance operated upon, and producing an extract of full strength without the necessity of resorting to subsequent evaporation or to the liability to change by the application of heat.

What I claim as my invention, and desire to secure by Letters Patent, is—

The herein-described process of manufacturing fluid extracts by subjecting the vegetable substances to be exhausted to maceration under a high degree of pressure without the application of heat, and subsequently expressing the extract from the woody fibers by a suitable press, substantially in the manner set forth.

In testimony whereof I have signed my name to this specification in the presence of two subscribing witnesses.

LINUS DE PUY.

Witnesses:
CHAS. D. LYON,
CHAS. W. EATON.